Patented July 9, 1940

2,207,581

UNITED STATES PATENT OFFICE 2,207,581

PREPARATION OF PRODUCTS CONTAINING VALUABLE HYDROCARBONS OR THEIR DERIVATIVES

Franz Duftschmid, Heidelberg, and Eduard Linckh and Fritz Winkler, Ludwigshafen-on-the-Rhine, Germany, assignors to I. G. Farbenindustrie Aktiengesellschaft, Frankfort-on-the-Main, Germany No Drawing. Application November 4, 1937, Serial No. 172,738. In Germany November 4, 1936

4 Claims. (Cl. 260—449)

The present invention relates to the production of hydrocarbons containing more than two carbon atoms in the molecule, in particular liquid and ordinarily solid hydrocarbons, and of liquid or solid oxygen-containing derivatives of hydrocarbons, such as methanol or higher alcohols, for example isobutyl alcohol, or ketones, aldehydes, organic acids and the like, from oxides of carbon, in particular carbon monoxide, and hydrogen.

It has already been proposed to prepare products containing the said hydrocarbons or oxygen-containing derivatives thereof from the oxides of carbon, in particular carbon monoxide, by means of hydrogen by heating these gases to suitable elevated temperatures, and while using catalysts, in a suitable oil, in particular in a liquid medium which consists of the liquid products obtained by the reaction of an amount of the same kind of initial gases which have previously been treated under the same or similar conditions, the said liquid medium being hereinafter referred to for the sake of brevity as the proper oil.

We have now found that the said reaction in the proper oil proceeds especially advantageously when the initial gas mixture contains more carbon monoxide than free hydrogen (measured by volume).

It has been proposed to use for the said reaction which hitherto usually has been carried out in the absence of a liquid medium gas mixtures of carbon monoxide and hydrogen in the ratio of from about 1:2 to 2:1. When working on a technical scale, however, only gas mixtures rich in hydrogen, in particular those containing carbon monoxide and hydrogen in the ratio of 1:2, have been actually used because when using a higher carbon monoxide content in the usual processes, the activity of the catalysts is impaired by the deposition of carbon black and consequently the reaction must be interrupted. Since many industrially important processes for the production of gases, such as the preparation of watergas, power gas or producer gas, yield gases containing as much carbon monoxide as, or more carbon monoxide than, hydrogen, a part of the carbon monoxide contained in the said industrial gases must be decomposed with steam to give hydrogen in a special operation in order to carry out the processes in which, as hitherto usual, more hydrogen than carbon monoxide is employed for the conversion of these gases into hydrocarbons or their oxygen-containing derivatives, whereas in the present process in which an excess of carbon monoxide over the amount of hydrogen is employed the said conversion of the industrial gases in a special operation is not necessary.

We have found that when carrying out the reaction in the proper oil and with an initial gas containing more carbon monoxide than hydrogen the aforementioned drawbacks are not observed and, therefore, it is no longer necessary to react a large portion of the carbon monoxide present in the industrial gases rich in carbon monoxide to yield hydrogen for the production of a feed gas suitable for the conversion into hydrocarbons.

Gas mixtures containing from 45 to 30 parts by volume of hydrogen to from 55 to 70 parts by volume of carbon monoxide may be employed.

The liquid medium is led in a cycle and this may be done in the same direction as the reacting gases have or in countercurrent thereto. It is advantageous to use as the proper oil one which contains considerable amounts (as for example more than 5 per cent) of constituents which are gaseous or vaporous under the temperature and pressure conditions used, i. e. which boil below the reaction temperature at the pressure used. Since this temperature is preferably between 200° and 420° C. the said gaseous or vaporous constituents consist at least to a large extent of those boiling within the boiling range of benzines.

The reaction may be carried out at atmospheric or increased pressure, as for example at 5, 20, 50, 100 to 300 atmospheres or more.

As catalysts there may be used all substances which accelerate in known manner the desired conversion into hydrocarbons and their oxygen-containing derivatives, in particular those which cause the reaction to proceed according to the equation:

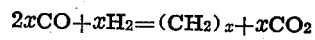

$$2xCO + xH_2 = (CH_2)_x + xCO_2$$

as for example catalysts containing iron as an essential constituent.

It has been found that by using highly active iron catalysts, the process according to the present invention renders possible a working free from objection and without troublesome deposition of carbon also under increased pressure even with a high throughput of gases rich in carbon monoxide. The new process also has the advantage that the yield of valuable hydrocarbons can be increased to a surprisingly high degree so that even the maximum yields hitherto obtainable only on a smaller scale with cobalt catalysts can be attained or even exceeded on a large scale with iron catalysts. The process may be carried out with advantage in two or more consecutive stages. For example the reaction of half of the mixture of carbon monoxide and hydrogen may be effected in the first stage, the remaining reaction being carried out in the second stage, if desired after previous washing out of the carbon dioxide formed. Instead of carrying out the process in two stages, the residual gas (resulting after the removal of liquid products and carbon dioxide) may also be returned in a cycle to the first stage. Since in the present process all side-reactions are avoided to a far-reaching extent the initial gas can be so rich in carbon monoxide that in the residual gas the components carbon monoxide and hydrogen are present in an unchanged ratio. Further, in addition to the carbon dioxide formed, only small amounts of gaseous substances not participating in the reaction, such as methane, occur in the residual gas, so that the latter, after removal of the carbon dioxide, has about the same composition as the initial gas and may be recirculated for many times without adjusting its composition.

It has been found that by working according to this invention while maintaining suitable conditions, not only can deposition of carbon be avoided but also the formation of water can be practically avoided, whereas according to the processes hitherto usual, in particular when it is desired to obtain industrially useful throughputs, considerable amounts of water are formed.

The following example will further illustrate how the said invention may be carried out in practice, but the invention is not restricted to this example. The parts are by volume.

*Example*

A mixture of 1 kilogram of iron powder, 25 grams of silicon powder, 25 grams of titanium dioxide, 50 grams of potassium permanganate and 50 grams of water is fused in a current of oxygen, whereby the iron is converted into ferrosoferric oxide. The resulting melt, after cooling, is broken into pieces having a diameter of from about 6 to 8 millimeters and treated for 48 hours with hydrogen at 650° C. There then follows a further treatment for 36 hours with hydrogen at 500° C. under a pressure of 75 atmospheres. The catalyst thus obtained is charged into a vertical high-pressure tube of 45 millimeters internal diameter and 0.8 meter in height in layers of about 1.5 centimeters in thickness at distances of 3 centimeters. The high-pressure tube is then charged with an oil boiling between about 50° and more than 300° C. which has been obtained by a previous reaction according to the process hereinafter described.

0.13 cubic meter per hour of a gas containing 57 parts of carbon monoxide, 41 parts of hydrogen and 2 parts of nitrogen is led upwards through the tube which is heated to a temperature of 340° C. and is kept under a pressure of 100 atmospheres. The gas flows through the tube and leaves it through a reflux condenser arranged vertically above the same. The oil formed in the tube and originally added is kept in the tube by the reflux condenser, an amount corresponding to the amount of oil formed being withdrawn.

The residual gas leaving the tube has the following composition:

| | Per cent by volume |
|---|---|
| $CO_2$ | 19.9 |
| Gaseous olefinic hydrocarbons | 1.2 |
| CO | 37.3 |
| $H_2$ | 33.9 |
| Gaseous paraffin hydrocarbons | 4.5 |
| Nitrogen | 3.2 |

0.76 cubic meter of residual gas leaves the tube for each cubic meter of initial gas led in. In a single passage, 44 per cent of the carbon monoxide and hydrogen are therefore brought into reaction. For each cubic meter of the mixture of carbon monoxide and hydrogen reacted there are formed 114 grams of oil, 33 grams of readily volatile hydrocarbons (propylene, butylene, pentene, propane and butane), 45 grams of gaseous hydrocarbons (methane, ethane and ethylene) and 650 grams of carbon dioxide. 39 per cent of the oil boils up to 100° C., 18 per cent between 100° and 150° C., 13 per cent between 150° and 200° C., 7 per cent between 200° and 250° C., 4 per cent between 250° and 300° C., and 19 per cent above 300° C.

The said yield is maintained during operation for six months without any subsiding of the activity of the catalyst or any troublesome deposition of carbon.

What we claim is:

1. A process for the catalytic conversion of carbon monoxide with hydrogen into hydrocarbons containing more than two carbon atoms in the molecule which comprises operating in a liquid medium consisting of hydrocarbon oils produced in a preceding operation of the same type and employing a gas mixture containing by volume more carbon monoxide than hydrogen.

2. In the process as claimed in claim 1, starting from a gas mixture containing from 55 to 70 parts of carbon monoxide to from 45 to 30 parts of hydrogen.

3. In the process as claimed in claim 1, working at a temperature between 200° and 420° C. and in the presence of a hydrocarbon oil containing more than 5 per cent of constituents which are uncondensed under the conditions of working.

4. A process of producing liquid hydrocarbons which consists in passing a mixture essentially containing hydrogen and carbon monoxide with a larger volume of the latter over an essentially iron containing catalyst in contact with a hydrocarbon oil obtained by a preceding reduction of carbon monoxide and removing condensable components and carbon dioxide from the reaction gases.

FRANZ DUFTSCHMID.
EDUARD LINCKH.
FRITZ WINKLER.